(12) United States Patent
Yajima

(10) Patent No.: US 8,031,576 B2
(45) Date of Patent: Oct. 4, 2011

(54) OPTICAL PICKUP DEVICE

(75) Inventor: Masatoshi Yajima, Osaka (JP)

(73) Assignee: Panasonic Corporation, Osaka (JP)

( * ) Notice: Subject to any disclaimer, the term of this patent is extended or adjusted under 35 U.S.C. 154(b) by 541 days.

(21) Appl. No.: 12/092,323

(22) PCT Filed: Nov. 16, 2006

(86) PCT No.: PCT/JP2006/322843
§ 371 (c)(1),
(2), (4) Date: May 1, 2008

(87) PCT Pub. No.: WO2007/069426
PCT Pub. Date: Jun. 21, 2007

(65) Prior Publication Data
US 2009/0116364 A1    May 7, 2009

(30) Foreign Application Priority Data
Dec. 12, 2005   (JP) .................................. 2005-358017

(51) Int. Cl.
*G11B 7/00* (2006.01)
(52) U.S. Cl. .............. 369/112.24; 369/116; 369/112.17; 347/255
(58) Field of Classification Search .................. None
See application file for complete search history.

(56) References Cited

U.S. PATENT DOCUMENTS

| | | | |
|---|---|---|---|
| 2003/0117932 A1 | 6/2003 | Morishima et al. | |
| 2004/0085885 A1* | 5/2004 | Kikuchi et al. | 369/112.24 |
| 2005/0099929 A1 | 5/2005 | Yamamoto et al. | |
| 2006/0114794 A1* | 6/2006 | Suzuki et al. | 369/112.01 |

FOREIGN PATENT DOCUMENTS

| | | |
|---|---|---|
| JP | 2003-203348 | 7/2003 |
| JP | 2005-149536 | 6/2005 |
| JP | 2005-196917 | 7/2005 |
| JP | 2006-155812 | 6/2006 |

OTHER PUBLICATIONS

International Search Report for corresponding Application No. PCT/JP2006/322843 dated Feb. 20, 2007.
Form PCT/ISA/237 and partial English translation.

* cited by examiner

*Primary Examiner* — Joseph Haley
(74) *Attorney, Agent, or Firm* — Renner, Otto, Boisselle & Sklar, LLP

(57) ABSTRACT

An optical pickup device according to the present invention includes: a first light source that outputs a first laser beam; a second light source that outputs a second laser beam; and an optical system that irradiates an information medium with the first and second laser beams. The information medium includes: an information layer on which user data is written; and a recording layer on which visible information, which is directly visible to a user, is recorded. The optical pickup device is characterized by outputting the first laser beam in writing the user data on the information layer but outputting the second laser beam in recording the visible information on the recording layer.

9 Claims, 10 Drawing Sheets

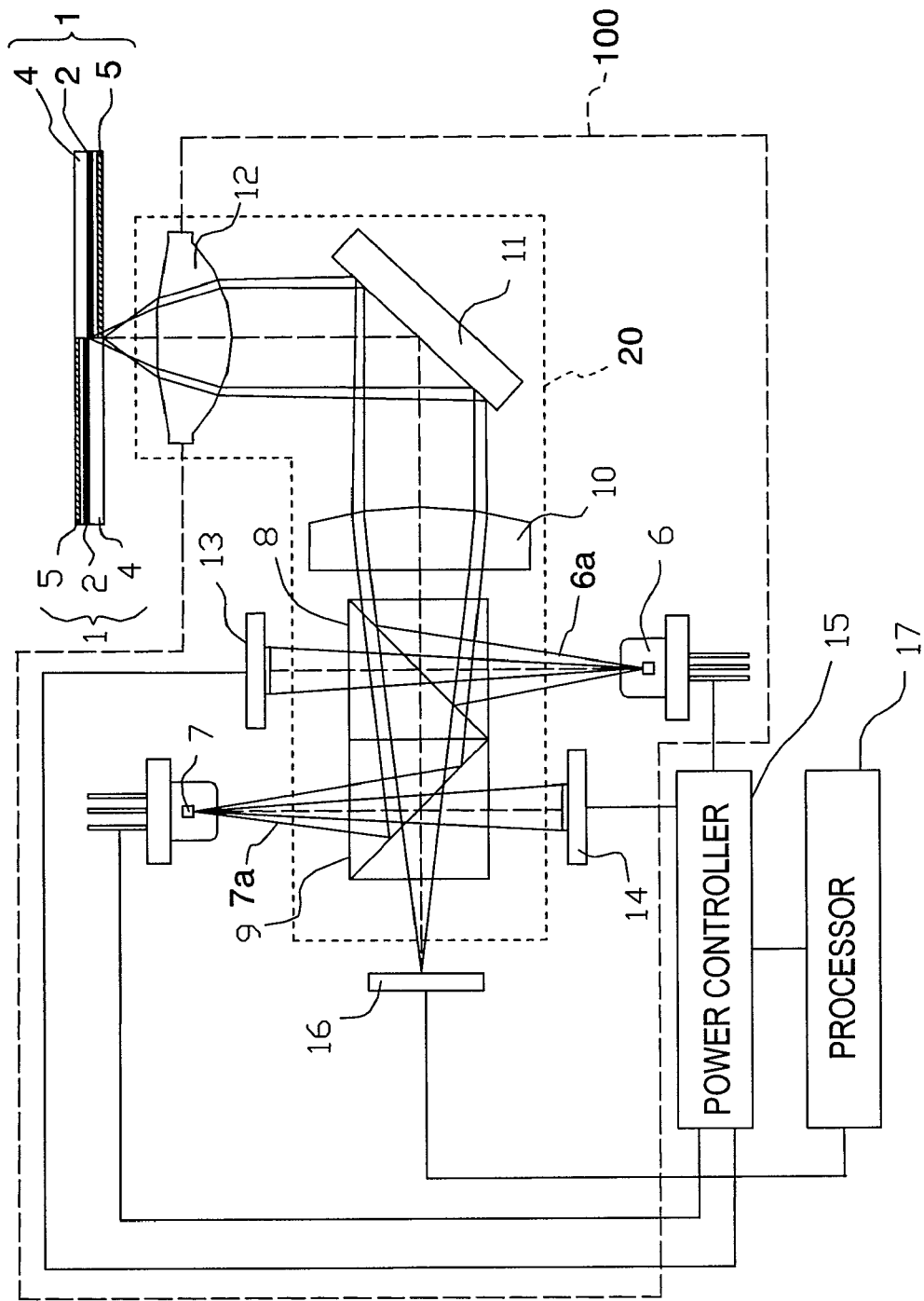

FIG.2
(a)
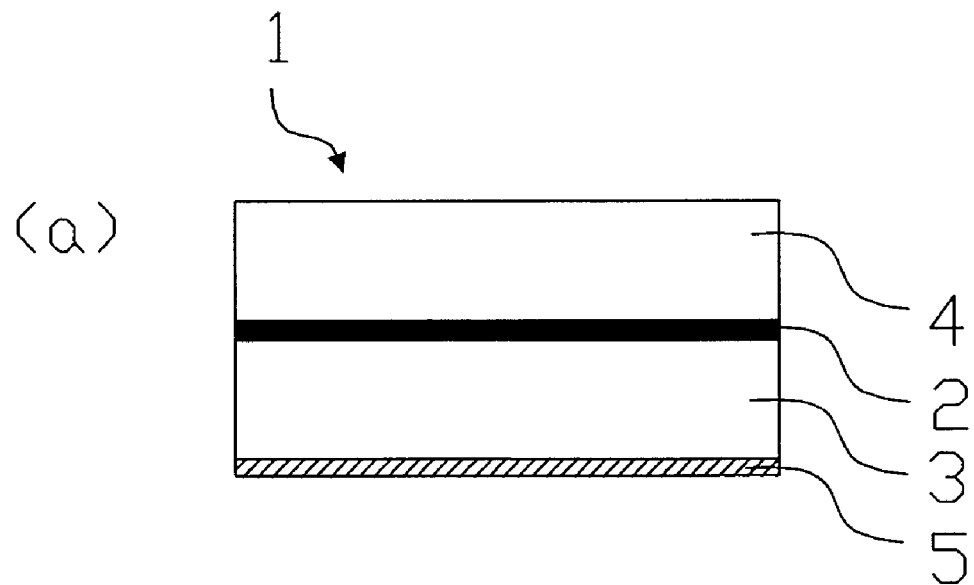
(b)
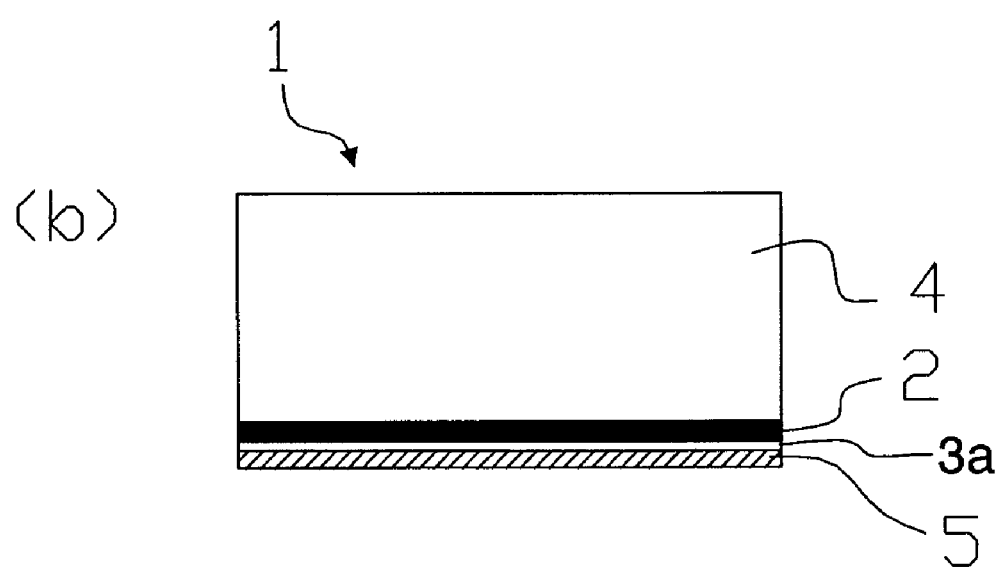

FIG.9  CONVENTIONAL ART
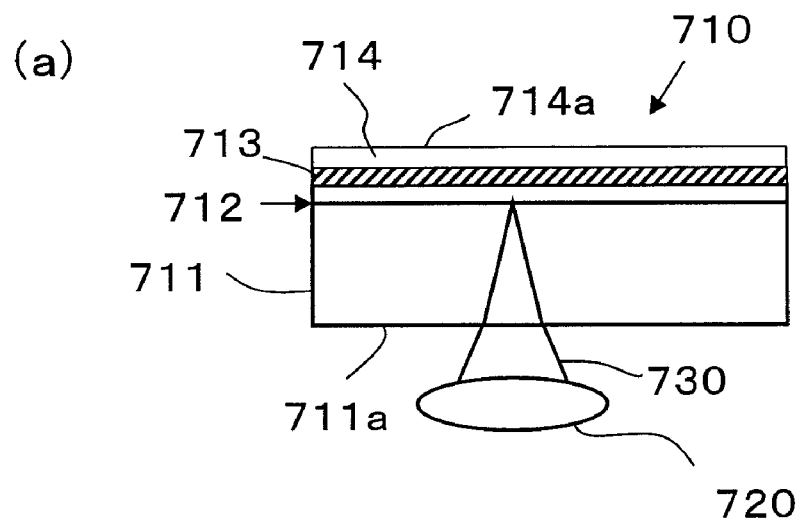
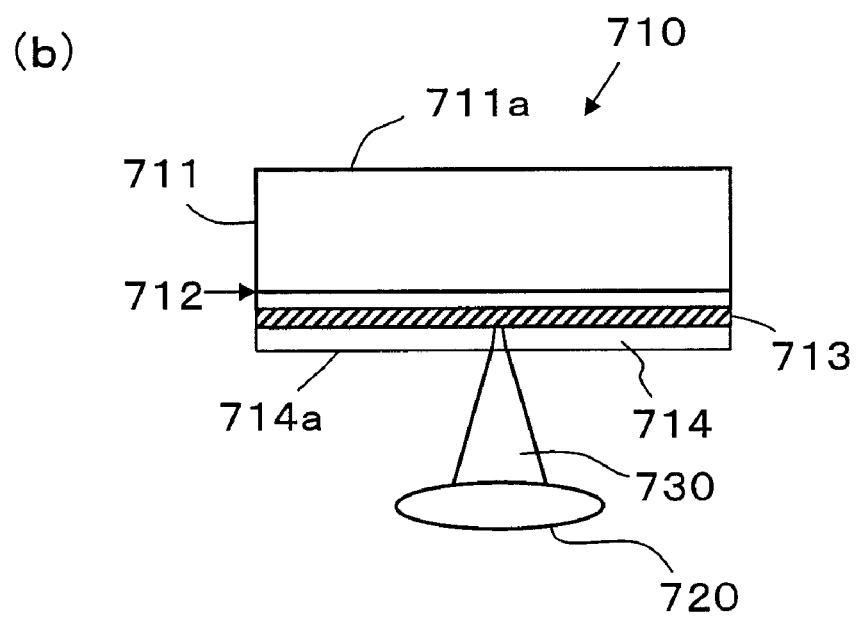

OPTICAL PICKUP DEVICE

TECHNICAL FIELD

The present invention relates to an optical pickup device for reading and/or writing data optically, and more particularly relates to an optical pickup device that can record visible information that is directly visible to the user.

BACKGROUND ART

The technique of writing digital data on optical disk media began to popularize when CD-Rs became popular. After that, DVD-Rs, DVD-RWs, DVD-RAMs and other optical disk media that have bigger storage capacities than CD-Rs have also become increasingly popular these days. A CD-R has a transparent substrate with a thickness of 1.2 mm and a storage layer supported on that transparent substrate. On the other hand, a DVD includes two transparent substrates with a thickness of 0.6 mm apiece and a storage layer sandwiched between those two transparent substrates. These storage layers store various types of digital data including image data, audio data, text data and programs and include either a dye or a phase change material.

As those various optical disk media have become increasingly popular, it has become more and more necessary to record index information or any other type of information, which allows the user to recognize the type of data stored on an optical disk medium easily, on the optical disk medium as visible information that is directly visible to him or her. To meet such a demand, printers for recording the visible information by printing letters or pictures on the label side of an optical disk medium are available. However, such a printer should be prepared separately from the optical disk drive, and therefore, would force the user to pay an extra cost. Also, generally speaking, a printer is put on sale as a peripheral device for a personal computer. That is why to print a label on a DVD on which some data has been written by a DVD recorder, a personal computer should be started and then the DVD should be put in place in the printer, thus causing the user extra time and trouble.

Patent Document No. 1 discloses an optical disk medium with a thermal layer for label printing and an optical disk drive for directly recording visible information on that thermal layer. The optical disk medium includes a protective substrate, a dye recording layer, a reflective layer, a protective layer, a thermal layer and a protective coating, which are stacked in this order. In recording visible information on the thermal layer using this optical disk drive, the optical disk medium is inserted into the optical disk drive such that the thermal layer faces an optical pickup device. Then, the optical disk drive irradiates the thermal layer with a laser beam, thereby recording visible information on the thermal layer. To determine whether the layer of the given optical disk medium that is facing the optical pickup device is the dye recording layer or the thermal layer, it may be determined whether or not ATIP (absolute time in pregroove) information is detected when the given optical disk medium is accessed. If NO ATIP information is detected, then it can be determined that the optical pickup device is now facing the thermal layer.

Patent Document No. 1: Japanese Patent Application Laid-Open Publication No. 2003-203348

DISCLOSURE OF INVENTION

Problems to be Solved by the Invention

FIG. 9(a) illustrates an optical disk medium 710 that has been introduced such that the condenser lens 720 of an optical pickup device faces a dye recording layer 712. On the other hand, FIG. 9(b) illustrates an information medium 710 that has been introduced such that the condenser lens 720 faces a thermal layer 713.

As shown in FIG. 9(a), the laser beam 730 condensed by the objective lens 720 is transmitted through a protective substrate 711 and then focused on the dye recording layer 712. The laser beam 730 is refracted while passing through the protective substrate 711. To focus the laser beam 730 on the dye recording layer 712, the optical system of the optical pickup device is designed so as to minimize the spherical aberration with such a refraction taken into account.

As can be seen from FIGS. 9(a) and 9(b), the distance from the surface 711a of the protective substrate 711 to the dye recording layer 712 is different from the distance from the surface 714a of the protective layer 714 to the thermal layer 713. For that reason, if the optical pickup device were designed so as to focus the laser beam 730 on the dye recording layer 712, the laser beam could not be focused on the thermal layer 713 due to the influence of spherical aberration and the light beam spot would be blurred. If such a blurred light beam spot were formed on the thermal layer 713, then the energy density per unit area would decrease and the temperature of the thermal layer 713 would not rise easily. However, if the power of the laser beam 730 were increased to raise the temperature, then the laser beam 730 would lose its stability and the laser diode would have a shorter life. Unless the power of the laser beam 730 is increased, one color production point should be irradiated for a longer time to increase the color production density of the thermal layer 713. And to irradiate one color production point for a longer time, the linear velocity of the optical disk medium 710 could be decreased. Or each color production point could be irradiated with the laser beam 730 a number of times. In any case, however, it would take a long time to finish recording the visible information.

In order to overcome the problems described above, the present invention has an object of providing an optical pickup device that can finish recording such visible information quickly.

Means for Solving the Problems

An optical pickup device according to the present invention includes: a first light source that outputs a first laser beam; a second light source that outputs a second laser beam; and an optical system that irradiates an information medium with the first and second laser beams. The information medium includes: an information layer having a user data area from/on which user data is read or written; and a recording layer on which visible information, which is directly visible to a user, is recorded. The optical pickup device outputs the first laser beam in reading or writing the user data from/on the information layer but outputs the second laser beam in recording the visible information on the recording layer.

In one preferred embodiment, the first light source and the optical system are arranged so as to correct a spherical aberration that produces when the information layer is irradiated with the first laser beam, and the second light source and the optical system are arranged so as to correct a spherical aberration that produces when the recording layer is irradiated with the second laser beam.

In another preferred embodiment, the optical system includes a condenser lens that condenses the first and second laser beams toward the information medium, the first laser beam is incident as a substantially parallel beam on the condenser lens, and the second laser beam is incident as a converged beam on the condenser lens.

In still another preferred embodiment, the optical system includes an optical element that reflects one of P and S waves and transmits the other wave. One of the first and second laser beams is a P wave and the other laser beam is an S wave. The first and second light sources and the optical element are arranged such that one of the first and second laser beams is transmitted through the optical element and the other laser beam is reflected by the optical element.

In yet another preferred embodiment, the optical system includes: a condenser lens for condensing the first and second laser beams toward the information medium; a first collimator lens, which is arranged between the first light source and the condenser lens to correct a spherical aberration that produces when the information layer is irradiated with the first laser beam; and a second collimator lens, which is arranged between the second light source and the condenser lens to correct a spherical aberration that produces when the recording layer is irradiated with the second laser beam.

In yet another preferred embodiment, the optical system includes a collimator lens, and the optical pickup device further includes: a supporting member that supports the collimator lens; and a drive section that drives the collimator lens and the supporting member along an optical axis.

In yet another preferred embodiment, the respective oscillation center wavelengths of the first and second laser beams are the same wavelength.

In yet another preferred embodiment, the power of the second laser beam is higher than that of the first laser beam.

In yet another preferred embodiment, the optical pickup device further includes at least one of a third light source that outputs a third laser beam and a fourth light source that outputs a fourth laser beam. The oscillation center wavelength of the third and fourth laser beams is different from the oscillation center wavelength of the first and second laser beams.

An optical disk drive according to the present invention includes: an optical pickup device according to any of the preferred embodiments of the present invention described above; a motor for rotating the information medium; a read/write section, which generates a signal to write user data in writing the user data on the information layer using the optical pickup device but which generates user data based on a read signal supplied from the optical pickup device in reading the user data from the information layer using the optical pickup device; a write signal generating section for generating a signal to record the visible information on the recording layer using the optical pickup device; a decision section that makes a decision on whether the light beam spot of one of the first and second laser beam output from the optical pickup device is located on the information layer or the recording layer; and a switching section that determines, based on the decision made by the decision section, whether the light source to energize is the first light source or the second one.

EFFECTS OF THE INVENTION

According to the present invention, the information medium includes an information layer on which user data is written and a recording layer on which visible information, which is directly visible to the user, is recorded. A first laser beam is output from a first light source in writing the user data on the information layer but a second laser beam is output from a second light source in recording the visible information on the recording layer. In this manner, by selectively using one of the two laser light sources in writing user data on the information layer and in recording visible information on the recording layer, these two types of write operations can get done under their own appropriate conditions. For example, by making best corrections on the spherical aberration that produces when the user data is written on the information layer and the spherical aberration that produces when the visible information is recorded on the recording layer, the write operations can get done with stability and the quality of the information written can be improved. In addition, by making the best spherical aberration corrections, the light beam spot comes to have increased energy density, and therefore, the visible information can be recorded quickly. Since the light beam spot has an increased energy density, the visible information can be recorded quickly even without increasing the power of the laser beam. As a result, the life of the light source can be extended. Furthermore, if the second light source with higher optical power than the first light source is adopted, then the visible information can be recorded even more quickly.

BRIEF DESCRIPTION OF DRAWINGS

FIG. 1A illustrates an optical pickup device according to a first preferred embodiment of the present invention.

FIG. 2($a$) illustrates a DVD-type information medium according to the first preferred embodiment of the present invention and FIG. 2($b$) illustrates a CD-type information medium according to the first preferred embodiment of the present invention.

FIG. 9($a$) illustrates an optical disk medium that has been introduced such that the condenser lens of an optical pickup device faces a dye recording layer and FIG. 9($b$) illustrates an information medium that has been introduced such that the condenser lens faces a thermal layer.

Figure 1B:
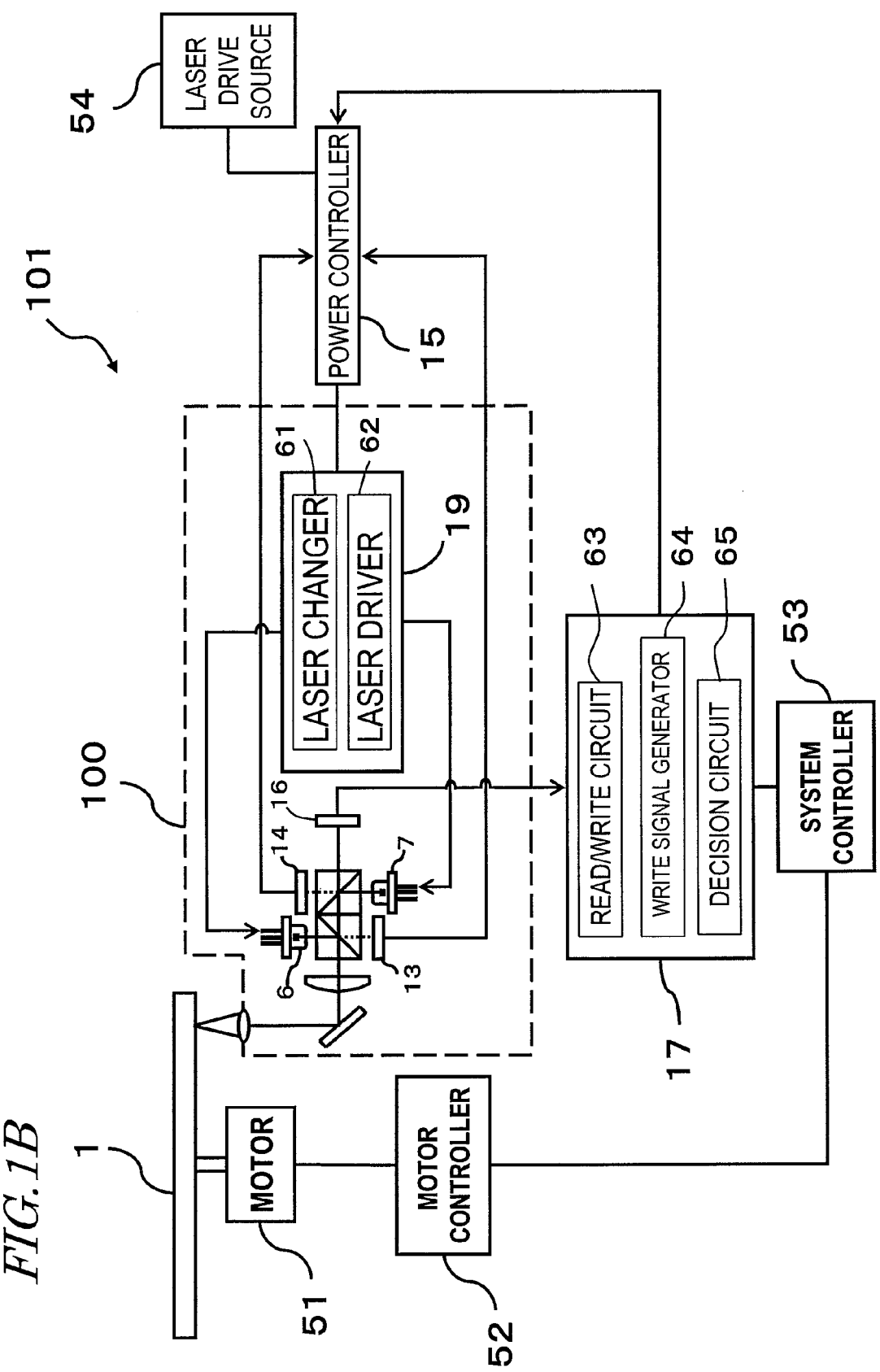
FIG. 1B illustrates an optical disk drive according to the first preferred embodiment of the present invention.

DESCRIPTION OF REFERENCE NUMERALS 1 information medium
2 information layer
3, 4 transparent substrate
5 visible information recording layer
6 first light source
7 second light source
8 first beam splitter
9 second beam splitter
10 collimator lens
11 mirror
12 condenser lens
13, 14 power monitoring photodetector
15 power controller
16, 33, 34, 36, 37 photodetector
17 processor 18 optical element
18a, 28a optical film
35, 38 light source unit
39, 79 diffraction element
39a, 79a aperture film
40 third light source
41 fourth light source
42 first collimator lens
43 second collimator lens
100, 200, 300, 400, 500, 600 optical pickup device

BEST MODE FOR CARRYING OUT THE INVENTION

Hereinafter, preferred embodiments of the present invention will be described with reference to the accompanying drawings.

Embodiment 1

Hereinafter, a First Preferred Embodiment of an optical pickup device according to the present invention will be described with reference to FIG. 1A, which illustrates an optical pickup device 100 as the first preferred embodiment. The optical pickup device 100 will be built in an optical disk drive that reads and/or writes data optically. Such an optical disk drive will be described later with reference to FIG. 1B.

As shown in FIG. 1A, the information medium 1 to be loaded into an optical disk drive includes a transparent substrate 4, an information layer 2 with a user data area (not shown) on which arbitrary user data is written, and a recording layer 5 on which visible information, which is directly visible to the user, is recorded. The recording layer 5 is arranged behind the information layer 2. The left half of the information medium 1 shown in FIG. 1A illustrates a situation where the information medium 1 has been introduced such that the condenser lens 12 of the optical pickup device 100 faces the information layer 2. On the other hand, the right half illustrates a situation where the information medium 1 has been introduced such that the condenser lens 12 faces the recording layer 5.

If the information medium 1 is a DVD-type medium, the information layer 2 may be located between the bonding faces of two transparent substrates 3 and 4, each having a thickness of 0.6 mm, and the recording layer 5 may be provided for one transparent substrate 3 as shown in FIG. 2(a). On the other hand, if the information medium 1 is a CD-type medium, then the information layer 2 may be provided for a transparent substrate 4 with a thickness of 1.2 mm and the recording layer 5 may be arranged so as to interpose an intermediate layer 3a between them as shown in FIG. 2(b). Alternatively, the recording layer 5 may be stacked directly on the information layer 2 with the intermediate layer 3a omitted. For example, if the information medium 1 is a read-only CD medium, the recording layer 5 may be stacked directly on the information layer 2. Optionally, the information medium 1 may include a protective coating that protects the recording layer 5.

As described above, the information medium 1 includes a stack of the information layer 2 and the recording layer 5. As used herein, the "stack" refers to both a situation where the information layer 2 and the recording layer 5 are directly stacked one upon the other and a situation where another layer or a substrate is interposed between the two layers 2 and 5.

On the information layer 2, various types of digital data including image data, audio data, text data and programs may be written. The recording layer 5 includes a thermal material. On the recording layer 5, characters, signs, pictures or any other type of visible information that makes the data stored on the information layer 2 easily recognizable is recorded. Examples of the visible information include the type, title, and image of the user data stored on the information layer 2 and the name of the user that handles the user data.

The optical pickup device 100 includes a first light source 6 that outputs a laser beam 6a, a second light source 7 that outputs a laser beam 7a, and an optical system 20 to irradiate the information medium 1 with these laser beams 6a and 7a. The optical system 20 includes a first beam splitter 8, a second beam splitter 9, a collimator lens 10, a mirror 11, and a condenser lens 12. The two laser beams 6a and 7a are both condensed by the same condenser lens 12 toward the information medium 1. The optical pickup device 100 further includes power monitoring photodetectors 13 and 14 and a photodetector 16.

The operation of this optical pickup device 100 is controlled by the power controller (PC circuit) 15 and processor 17 of the optical disk drive. The first and second light sources 6 and 7 are laser diodes that output a laser beam in response to the output signal of the power controller 15. The first light source 6 outputs the laser beam 6a when the user data is read or written from/on the information layer 2. The second light source 7 outputs the laser beam 7a when the visible information is recorded on the recording layer 5. The respective oscillation center wavelengths of these two laser beams 6a and 7a are the same wavelength. Specifically, the laser beams 6a and 7a have their centers of oscillation at a wavelength of approximately 660 nm (associated with an NA of approximately 0.63 of the condenser lens 12) when used to play DVDs but have their centers of oscillation at a wavelength of approximately 790 nm (associated with an NA of approximately 0.50 of the condenser lens 12) when used to play CDs.

Next, an exemplary optical disk drive with this optical pickup device 100 built in will be described with reference to FIG. 1B, which illustrates an optical disk drive 101 according to this preferred embodiment.

The optical disk drive 101 includes the optical pickup device 100, the power controller 15 and the processor 17. The optical disk drive 101 further includes a motor 51 that rotates and drives the information medium 1, a motor controller 52 that controls the rotational frequency of the motor 51, a system controller 53 that controls the respective components of the optical disk drive 101, a laser drive source 54 that supplies laser drive current to energize the first and second light sources 6 and 7, and a laser controller 19. In the example illustrated in FIG. 1A, the laser controller 19 (not shown in FIG. 1A) is included in the power controller 15. On the other hand, in the example illustrated in FIG. 1B, the laser controller 19 is included in the optical pickup device 100. Alternatively, the laser controller 19 may also be provided outside of the optical pickup device 100 separately from the power controller 15. The operation of the laser controller 19 will be described later.

When the optical disk drive 101 is loaded with the information medium 1, the motor controller 52 supplies drive current to the motor 51 in accordance with the instruction given by the system controller 53, thereby rotating and driving the information medium 1 with the rotational frequency of the motor 51 controlled to a predetermined one.

Synchronously with the rotation of the motor 51, a pickup moving mechanism (not shown) moves the optical pickup device 100 toward the inner zone of the information medium 1. The information medium 1 has a table of contents (TOC) area in the inner zone. When the position detecting section of the pickup moving mechanism senses the optical pickup device 100 reach the TOC area, the processor 17, the power controller 15 and the laser controller 19 energize the light source 6 in accordance with an instruction given by the system controller 53.

The laser beam 6a emitted from the light source 6 is condensed by the condenser lens 12 (see FIG. 1A) and then incident on the information medium 1. The light reflected from the information medium 1 passes through the condenser lens 12, the mirror 11, the collimator lens 10 and the first and second beam splitters 8 and 9 to be incident on the photodetector 16. The reflected light is converted by the photodetector 16 into an electrical signal. In this manner, a read signal representing the intensity of the reflected light is supplied to the processor 17.

The processor 17 includes a read/write circuit 63, a write signal generator 64 and a decision circuit 65.

The read/write circuit 63 is well known in the field of optical disk drives. In reading the user data that was written on the information layer 2 using the optical pickup device 100, the read/write circuit 63 decodes the read signal supplied from the optical pickup device 100 to generate user data. On the other hand, in writing arbitrary user data on the information layer 2 as recording marks (which are also called "pits") using the optical pickup device 100, the read/write circuit 63 generates a write signal to write the user data.

The write signal generator 64 generates a write signal to record the visible information on the recording layer 5 using the optical pickup device 100. Specifically, the write signal generator 64 generates a write signal representing the visible information that has been entered through an input device such as a keyboard or a scanner, which is provided for the optical disk drive 101 or a personal computer.

The decision circuit 65 determines whether the light beam spot of the laser beam 6a is located on the information layer 2 or on the recording layer 5. If the light beam spot is located on the information layer 2, then the read/write circuit 63 provides TOC information for the decision circuit 65. That is why by determining whether or not the TOC information is provided, the decision circuit 65 makes a decision on whether the condenser lens 12 is facing the information layer 2 or the recording layer 5. On recognizing the TOC information, the decision circuit 65 determines that the condenser lens 12 is now facing the information layer 2. On the other hand, if no TOC information has been recognized, then the decision circuit 65 determines that the condenser lens 12 is now facing the recording layer 5.

In this example, as the information medium 1 has the TOC area, it can be determined, by seeing if the TOC information is detected, which direction the information medium 1 is now facing. Alternatively, if the information medium 1 is a DVD, it can also be determined, by seeing if there is any address information in lead-in area, if there is any track in the user data area, or if any tracking error signal is detected, which direction the information medium 1 is now facing.

If the decision circuit 65 determines that the condenser lens 12 is now facing the information layer 2, then the power controller 15 controls the laser drive current, supplied from the laser drive source 54, to a power associated with the information layer 2 and outputs laser drive current to the laser controller 19.

The laser controller 19 includes a laser changer 61 and a laser driver 62. The laser driver 62 is well known in the field of optical disks and energizes either the first light source 6 or the second light source 7 with the laser drive current received. The laser changer 61 is a switching circuit that determines, based on the decision made by the decision circuit 65, which of the two light sources 6 and 7 should be activated.

If the decision circuit 65 determines that the condenser lens 12 is now facing the information layer 2, the laser changer 61 selects the first light source 6. In that case, the laser drive current is supplied to the first light source 6 and the user data is read from, or written on, the information layer 2. On the other hand, if the decision circuit 65 determines that the condenser lens 12 is now facing the recording layer 5, then the laser changer 61 selects the second light source 7. In that case, the laser drive current is supplied to the second light source 7 and the visible information is recorded on the recording layer 5.

Next, it will be described exactly how the optical pickup device 100 operates in reading or writing the user data from/ on the information layer 2. In this case, the information medium 1 has been loaded into the optical disk drive such that the condenser lens 12 faces the information layer 2.

The laser beam 6a emitted from the first light source 6 is reflected by the reflective film of the first beam splitter 8, and then transformed into a substantially parallel beam by the collimator lens 10. Next, the laser beam 6a, transmitted through the collimator lens 10, is reflected by the mirror 11 and then enters the condenser lens 12 along the optical axis of the condenser lens 12. The laser beam 6a that has come as the substantially parallel beam is condensed by the condenser lens 12 and incident on the information layer 2. The incoming laser beam 6a is focused on the information layer 2 to leave a light beam spot on the information layer 2. The first light source 6 and the optical system 20 are positioned and arranged such that best correction can be made on the spherical aberration that produces when the information layer 2 is irradiated with the laser beam 6a.

The power monitoring photodetector 13 detects a part of the laser beam 6a that has been transmitted through the first beam splitter 8 and outputs the detection signal to the power controller 15. In response, the power controller 15 monitors the power of the laser beam 6a based on the detection signal and supplies an appropriate amount of drive current to the first light source 6.

The light reflected from the information medium 1 passes through the condenser lens 12, the mirror 11, and the collimator lens 10 and then is transmitted through the respective reflective films of the first and second beam splitters 8 and 9. Then, the reflected light enters the photodetector 16. Based on the incoming light, the photodetector 16 generates a focus error signal, a tracking error signal, a data signal representing the user data stored on the information layer 2, and other signals. The processor 17 receives those signals generated by the photodetector 16 and controls the operation of the optical pickup device 100 using those signals.

Next, it will be described exactly how the optical pickup device 100 operates in recording the visible information on the recording layer 5. In this case, the information medium 1 has been loaded into the optical disk drive such that the condenser lens 12 faces the recording layer 5.

The laser beam 7a emitted from the second light source 7 is reflected by the reflective film of the second beam splitter 9, and then enters the collimator lens 10 as a diverged beam. Next, the laser beam 7a is transformed by the collimator lens 10 into a converged beam, which is then reflected by the mirror 11 and then enters the condenser lens 12 along the optical axis of the condenser lens 12. The laser beam 7a that has come as the converged beam is condensed by the condenser lens 12 and incident on the recording layer 5 to leave a light beam spot on the recording layer 5. The second light source 7 and the optical system 20 are positioned and arranged such that best correction can be made on the spherical aberration that produces when the recording layer 5 is irradiated with the laser beam 7a.

The power monitoring photodetector 14 detects a part of the laser beam 7a that has been transmitted through the second beam splitter 9 and outputs the detection signal to the power controller 15. In response, the power controller 15 monitors the power of the laser beam 7a based on the detection signal and supplies an appropriate amount of drive current to the second light source 7.

In writing the user data on the information layer 2, the transparent substrate 4 is present between the condenser lens 12 and the information layer 2. That is why the distance from the information layer 2 to the surface of the optical disk medium 1 that is opposed to the condenser lens 12 when the user data is written on the information layer 2 is different from the distance from the recording layer 5 to the surface of the optical disk medium 1 that is opposed to the condenser lens 12 when the visible information is recorded on the recording layer 5. For that reason, to realize good focusing state on both the information layer 2 and the recording layer 5 using the same condenser lens 12, the spherical aberration needs to be corrected. In this preferred embodiment, a finite optical system is used as the optical system 20 and the first and second light sources 6 and 7 and the optical system 20 are arranged such that the best spherical aberration correction can be made using a spherical aberration correction method applied to such a finite optical system. For example, by adjusting the optical path length between the first light source 6 and the collimator lens 10, best correction can be made on the spherical aberration that produces when the user data is written on the information layer 2. Also, by adjusting the optical path length between the second light source 7 and the collimator lens 10, best correction can be made on the spherical aberration that produces when the visible information is recorded on the recording layer 5.

To locate the light beam spot on the recording layer 5, a reference line that runs in the radial direction on the optical disk medium 1 may be defined in advance on the recording layer 5. The reference line can be detected by getting the reflected light received at the photodetector 16. Based on the location of the reference line, the rotational velocity of the optical disk medium 1, and the location of the condenser lens 12 in the radial direction on the optical disk medium 1, the light beam spot on the recording layer 5 can be located.

According to this preferred embodiment, two different laser beams are selectively used in writing the user data on the information layer 2 and in recording the visible information on the recording layer 5, and best correction can be made on the spherical aberration that produces during each of these write operations. As a result, the write operations can get done with good stability and the quality of the information written can be improved. In addition, by making the best spherical aberration corrections, the light beam spot comes to have increased energy density, and therefore, the visible information can be recorded quickly. Since the light beam spot has an increased energy density, the visible information can be recorded quickly even without increasing the power of the laser beam. Consequently, the life of the light source can be extended, too.

In addition, the same optical pickup device 100 uses the two light sources 6 and 7 that share the same optical system 20 in common. That is why the overall size of an optical disk drive including such an optical pickup device 100 can be reduced.

It should be noted that as two different laser beams are used in writing user data on the information layer 2 and in recording visible information on the recording layer 5, the laser beams 6a and 7a may have either the same power or mutually different powers. Likewise, the numerical aperture NA calculated on the relation between the laser beam 6a and the condenser lens 12 and the numerical aperture NA calculated on the relation between the laser beam 7a and the condenser lens 12 may be either the same or different from each other.

The recording layer 5 includes a thermal developer that produces a color under the heat generated upon the exposure to the incoming laser beam 7a. To make the letters, pictures or any other type of visible information recorded on the recording layer 5 as easily recognizable as possible, those letters or pictures drawn preferably have a high contrast ratio. If the thermal developer turns into black under the heat, the original color of the recording layer 5 is preferably either white or a whitish light color. Meanwhile, as there is no need to consider visibility for the information layer 2, a colored substance that absorbs a laser beam easily is used as the material of the information layer 2, and therefore, high thermooptic conversion efficiency is achieved. However, if the color of the recording layer 5 is either white or a whitish light color as described above, then the thermooptic conversion efficiency will be low. For that reason, to increase the write rate of the visible information, it is important to increase the energy density of the light beam spot.

Also, the rated output power of the second light source 7 is preferably higher than that of the first light source 6. If the power of the laser beam 7a is higher than that of the laser beam 6a, the write rate of the visible information can be further increased.

Embodiment 2

Hereinafter, a second preferred embodiment of an optical pickup device according to the present invention will be described with reference to FIG. 3, which illustrates an optical pickup device 200 as the second preferred embodiment.

The optical pickup device 200 includes an optical system 21 in place of the optical system 20 of the optical pickup device 100 shown in FIG. 1A. Also, the optical pickup device 200 includes light source units 35 and 38.

The light source unit 35 includes the first light source 6 and photodetectors 33 and 34 that are arranged near the first light source 6. On the other hand, the light source unit 38 includes the second light source 7 and photodetectors 36 and 37 that are arranged near the second light source 7. In this preferred embodiment, the laser beam 6a is a P wave (horizontal wave) and the laser beam 7a is an S wave (vertical wave).

The optical system 21 includes a beam splitter 28 in place of the first and second beam splitters 8 and 9 of the optical system 20. The beam splitter 28 includes an optical film 28a that reflects a P wave but transmits an S wave. The optical system 21 further includes a diffraction element 39, which is arranged on the optical path between the mirror 11 and the condenser lens 12.

The first light source 6 is arranged so as to emit a P wave toward the optical film 28a. Specifically, the laser beam 6a emitted from the first light source 6 is reflected from, and deflected by, the optical film 28a, and then transformed into a substantially parallel beam by the collimator lens 10. Next, the laser beam 6a, transmitted through the collimator lens 10, is reflected by the mirror 11 and then enters the condenser lens 12 along the optical axis of the condenser lens 12. The laser beam 6a that has come as the substantially parallel beam is condensed by the condenser lens 12 and incident on the information layer 2. The incoming laser beam 6a is focused on the information layer 2 to leave a light beam spot on the information layer 2. The first light source 6 and the optical system 21 are positioned and arranged such that best correction can be made on the spherical aberration that produces when the information layer 2 is irradiated with the laser beam 6a.

The power monitoring photodetector 13 detects a part of the laser beam 6a that has been transmitted through the collimator lens 10 and outputs the detection signal to the power controller 15. In response, the power controller 15 monitors the power of the laser beam 6a based on the detection signal and supplies an appropriate amount of drive current to the first light source 6.

The light reflected from the information medium 1 passes through the condenser lens 12 and then is diffracted by the diffraction element 39. The diffracted light (not shown) passes through the mirror 11 and the collimator lens 10 and then is reflected by the beam splitter 28. Then, the reflected light enters the photodetectors 33 and 34. Based on the received diffracted light, the photodetectors 33 and 34 generate a focus error signal, a tracking error signal, a data signal representing the user data stored on the information layer 2, and other signals. The processor 17 receives those signals generated by the photodetectors 33 and 34 and controls the operation of the optical pickup device 200 using those signals.

The second light source 7 is arranged so as to emit an S wave toward the optical film 28a. Specifically, the laser beam 7a emitted from the second light source 7 is transmitted through the optical film 28a, and then converged by the collimator lens 10. Next, the laser beam 7a, transmitted through the collimator lens 10, is then reflected by the mirror 11 and then enters the condenser lens 12 along the optical axis of the condenser lens 12. The laser beam 7a that has come as the converged beam is condensed by the condenser lens 12 and incident on the recording layer 5 to leave a light beam spot on the recording layer 5. The second light source 7 and the optical system 21 are positioned and arranged such that best correction can be made on the spherical aberration that produces when the recording layer 5 is irradiated with the laser beam 7a.

The power monitoring photodetector 13 detects a part of the laser beam 7a that has been transmitted through the collimator lens 10 and outputs the detection signal to the power controller 15. In response, the power controller 15 monitors the power of the laser beam 7a based on the detection signal and supplies an appropriate amount of drive current to the second light source 7.

As described above, the distance from the information layer 2 to the surface of the optical disk medium 1 closer to the information layer 2 is different from the distance from the recording layer 5 to the surface of the optical disk medium 1 closer to the recording layer 5. For that reason, to realize good focusing state on both the information layer 2 and the recording layer 5 using the same condenser lens 12, the spherical aberration needs to be corrected. In this preferred embodiment, a finite optical system is also used as the optical system 21 and the first and second light sources 6 and 7 and the optical system 21 are arranged such that the best spherical aberration correction can be made using a spherical aberration correction method applied to such a finite optical system.

According to this preferred embodiment, two different laser beams are selectively used in writing the user data on the information layer 2 and in recording the visible information on the recording layer 5, and best correction can be made on the spherical aberration that produces during each of these write operations. As a result, the write operations can get done with good stability and the quality of the information written can be improved. In addition, by making the best spherical aberration corrections, the light beam spot comes to have increased energy density, and therefore, the visible information can be recorded quickly. Since the light beam spot has an increased energy density, the visible information can be recorded quickly even without increasing the power of the laser beam. Consequently, the life of the light source can be extended, too.

In addition, the same optical pickup device 200 uses the two light sources 6 and 7 that share the same optical system 21 in common. That is why the overall size of an optical disk drive including such an optical pickup device 200 can be reduced.

Optionally, the laser beam 6a may be an S wave and the laser beam 7a may be a P wave. Even so, the first and second light sources 6 and 7 and the optical system 21 are also arranged to make the best spherical aberration corrections.

Figure 4:
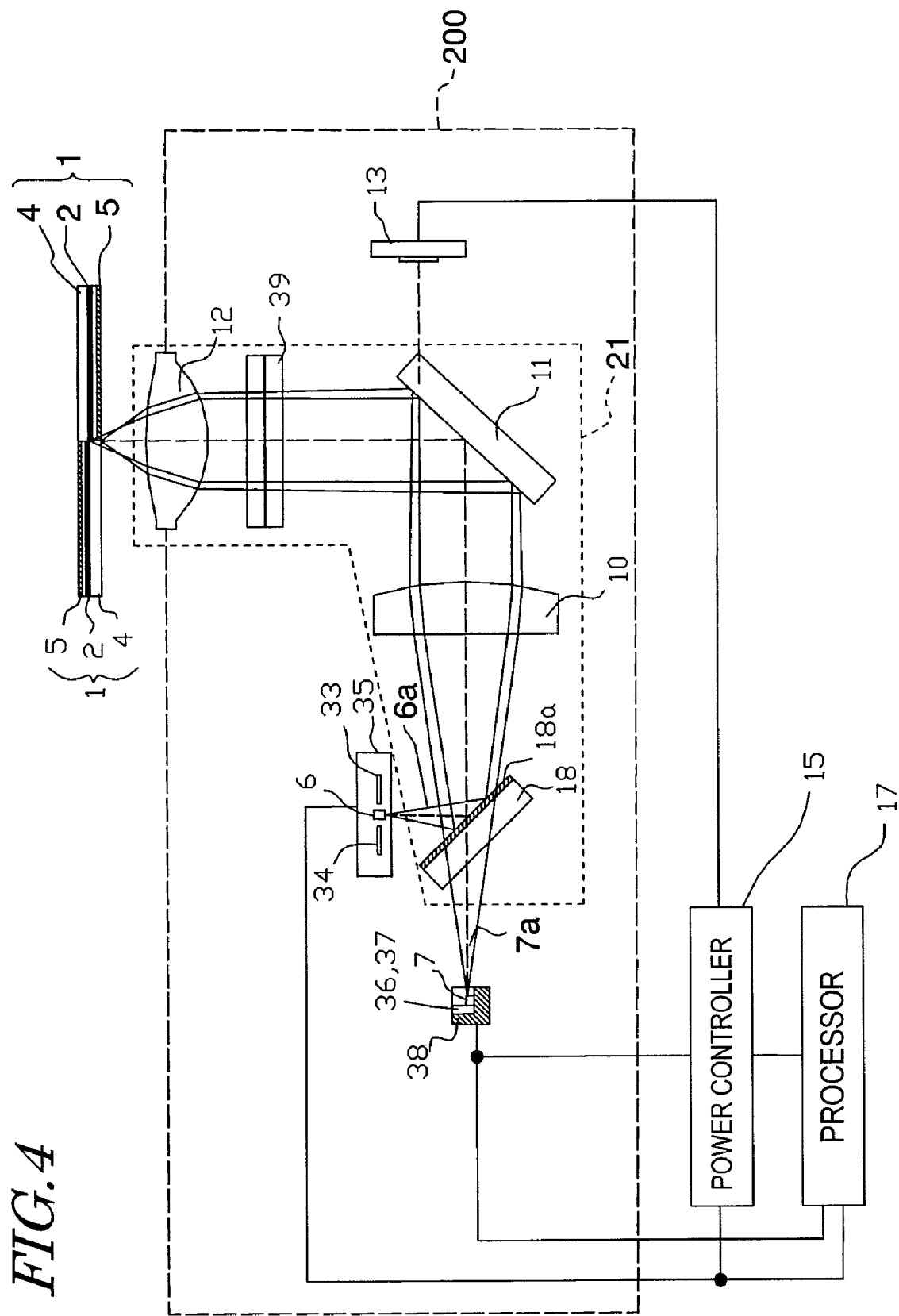
FIG. 4 illustrates an alternative optical pickup device according to the second preferred embodiment of the present invention.

Alternatively, the beam splitter 28 may be replaced with a glass or white plate optical element 18 including an optical film 18a that reflects a P wave but transmits an S wave as shown in FIG. 4. By using either the beam splitter 28 or the plate optical element 18 instead of the first and second beam splitters 8 and 9, the optical pickup device can have a simplified configuration and can be fabricated at a reduced cost.

Embodiment 3

A third preferred embodiment of an optical pickup device according to the present invention will be described with reference to FIGS. 5(a) and 5(b). FIG. 5(a) illustrates an optical pickup device 300 as the third preferred embodiment of the present invention. The optical pickup device 300 can write user data and visible information on both a DVD-type information medium 1 and a CD-type information medium 1. The left half of the information medium 1 shown in FIG. 5(a) is a CD medium while the right half thereof is a DVD medium.

The materials of the respective information layers 2 of the CD and DVD media may belong to either the same system or two different systems. For example, both of these layers may include an organic dye as a main ingredient. Alternatively, one of the two layers may include an organic dye as a main ingredient but the other layer may include a chalcogenide-based compound as a main ingredient.

A light source unit 35 of the optical pickup device 300 includes a third light source 40, which is arranged adjacent to the first light source 6 in order to emit a laser beam 40a. FIG. 5(b) illustrates a light source unit 38 as viewed in the direction indicated by the arrow A. The light source unit 38 includes a fourth light source 41, which is arranged adjacent to the second light source 7 in order to emit a laser beam 41a. The oscillation center wavelength of the laser beams 40a and 41a is different from the oscillation center wavelength of the laser beams 6a and 7a. The diffraction element 39 of the optical system 21 includes an aperture film 39a with wavelength selectivity. Alternatively, this aperture film 39a may be provided for the condenser lens 12.

A predetermined gap (of 110 μm, for example) is provided between the points of emission of the first and third light sources 6 and 40. The same predetermined gap (of 110 μm, for example) is also provided between the points of emission of the second and fourth light sources 7 and 41.

In this preferred embodiment, the laser beams 6a and 7a are used to write user data and visible information on a DVD-type information medium 1, while the laser beams 40a and 41a are used to write user data and visible information on a CD-type information medium 1. The laser beams 6a and 7a have their center of oscillation at a wavelength of approximately 660 nm, while the laser beams 40a and 41a have their center of oscillation at a wavelength of approximately 790 nm. The diffraction element 39 is provided with an aperture film 39a such that the condenser lens 12 has an NA of approximately 0.63 when the laser beams 6a and 7a are emitted and has an NA of approximately 0.50 when the laser beams 40a and 41a are emitted.

The third light source 40 and the optical system 21 are arranged so as to make the best correction on a spherical aberration that produces when the information layer 2 is irradiated with the laser beam 40a. Meanwhile, the fourth light source 41 and the optical system 21 are arranged so as to make the best correction on a spherical aberration that produces when the recording layer 5 is irradiated with the laser beam 41a. In this manner, the best light beam spot can be formed on the information and recording layers 2 and 5 of the DVD and CD media. As a result, the write operations can get done with good stability and the quality of the information written can be improved. In addition, by making the best spherical aberration corrections, the light beam spot comes to have increased energy density, and therefore, the visible information can be recorded quickly. Since the light beam spot has an increased energy density, the visible information can be recorded quickly even without increasing the power of the laser beam. Consequently, the life of the light source can be extended, too.

In addition, the same optical pickup device 300 uses the four light sources 6, 7, 40 and 41 that share the same optical system 21 in common. That is why the overall size of an optical disk drive including such an optical pickup device 300 can be reduced.

Optionally, fifth and sixth light sources (not shown) that emit a laser beam at an oscillation center wavelength of approximately 405 nm may be arranged adjacent to the first and second light sources 6 and 7, respectively, such that user data and visible information can also be written even on a BD information medium 1.

Embodiment 4

Figure 6:
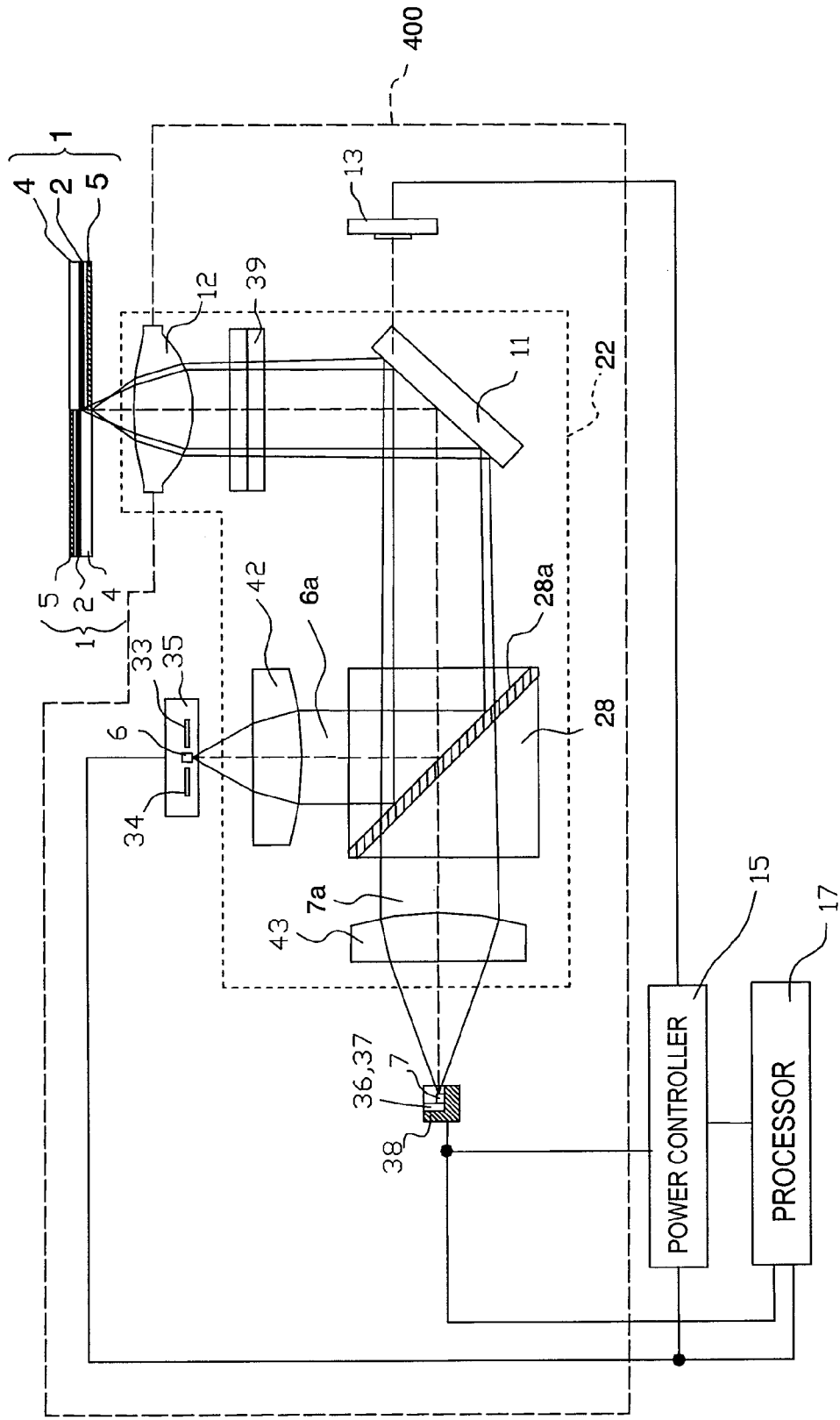
FIG. 6 illustrates an optical pickup device according to a fourth preferred embodiment of the present invention.

Hereinafter, a fourth preferred embodiment of an optical pickup device according to the present invention will be described with reference to FIG. 6, which illustrates an optical pickup device 400 as the fourth preferred embodiment of the present invention.

Figure 3:
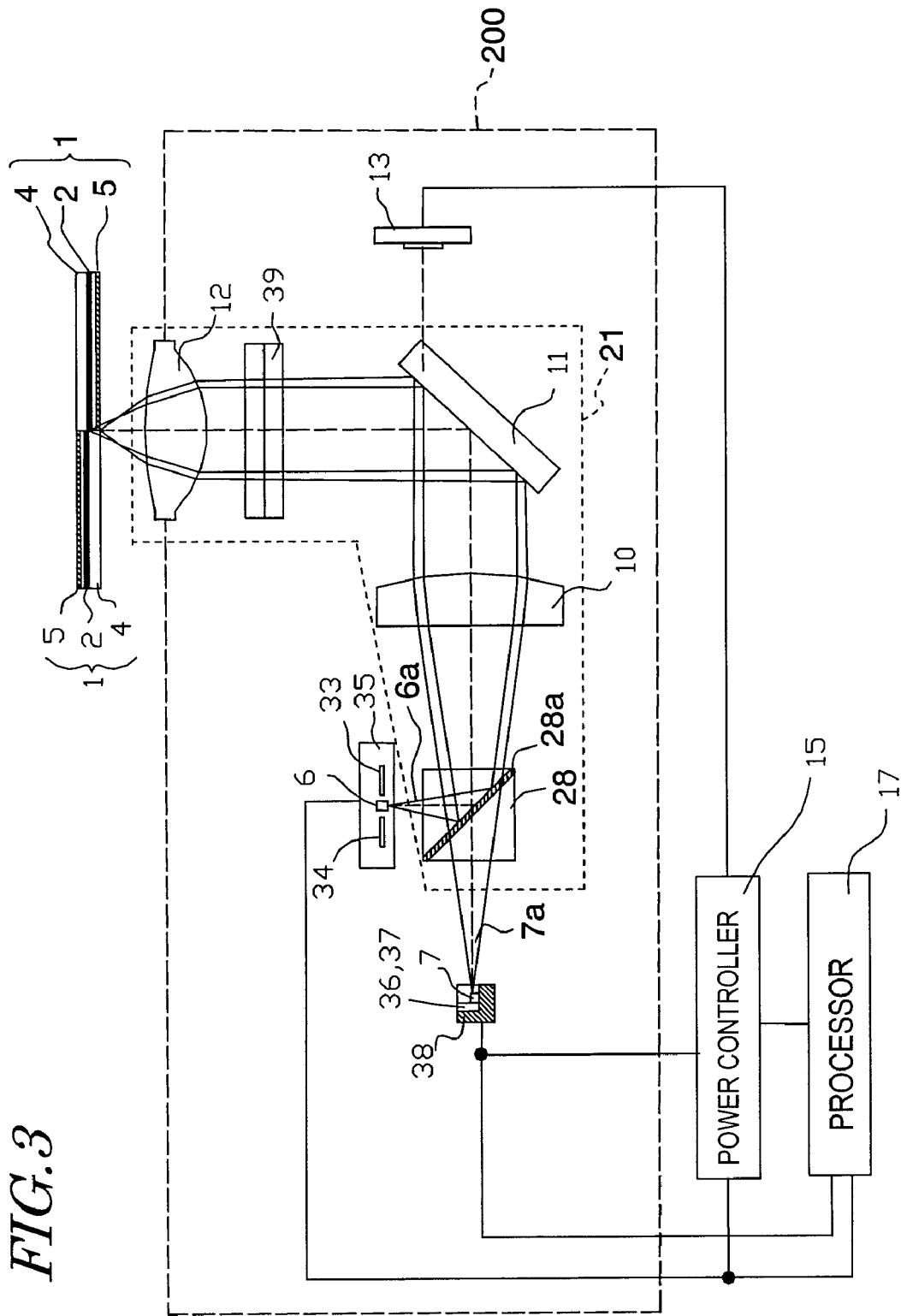
FIG. 3 illustrates an optical pickup device according to a second preferred embodiment of the present invention.

The optical pickup device 400 includes an optical system 22 in place of the optical system 21 of the optical pickup device 200 shown in FIG. 3. The optical system 22 includes first and second collimator lenses 42 and 43 instead of the collimator lens 10.

The first collimator lens 42 is arranged on the optical path between the first light source 6 and the condenser lens 12 so as to make the best correction on a spherical aberration that produces when the information layer 2 is irradiated with the laser beam 6a. In this preferred embodiment, the first collimator lens 42 is arranged between the first light source 6 and the beam splitter 28. On the other hand, the second collimator lens 43 is arranged on the optical path between the second light source 7 and the condenser lens 12 so as to make the best correction on a spherical aberration that produces when the recording layer 5 is irradiated with the laser beam 7a. In this preferred embodiment, the second collimator lens 43 is arranged between the second light source 7 and the beam splitter 28. By providing two collimator lenses 42 and 43 for the two laser beams 6a and 7a independently of each other, the collimator lenses can be positioned more freely in order to correct the spherical aberrations that produce responsive to the laser beams 6a and 7a. As a result, the spherical aberration correction can be done with even higher precision.

In addition, such an arrangement in which the collimator lenses are fixed is more resistant to disturbances than the arrangement in which the collimator lens is moved. On top of that, since there is no need to provide any mechanism for moving the collimator lenses, the optical pickup device can have a simplified configuration.

According to this preferred embodiment, two different laser beams are selectively used in writing the user data on the information layer 2 and in recording the visible information on the recording layer 5, and best correction can be made on the spherical aberration that produces during each of these write operations. As a result, the write operations can get done with good stability and the quality of the information written can be improved. In addition, by making the best spherical aberration corrections, the light beam spot comes to have increased energy density, and therefore, the visible information can be recorded quickly. Since the light beam spot has an increased energy density, the visible information can be recorded quickly even without increasing the power of the laser beam. Consequently, the life of the light source can be extended, too.

In addition, the same optical pickup device 400 uses the two light sources 6 and 7 that share the same optical system 22 in common. That is why the overall size of an optical disk drive including such an optical pickup device 400 can be reduced.

Embodiment 5

Figure 5:
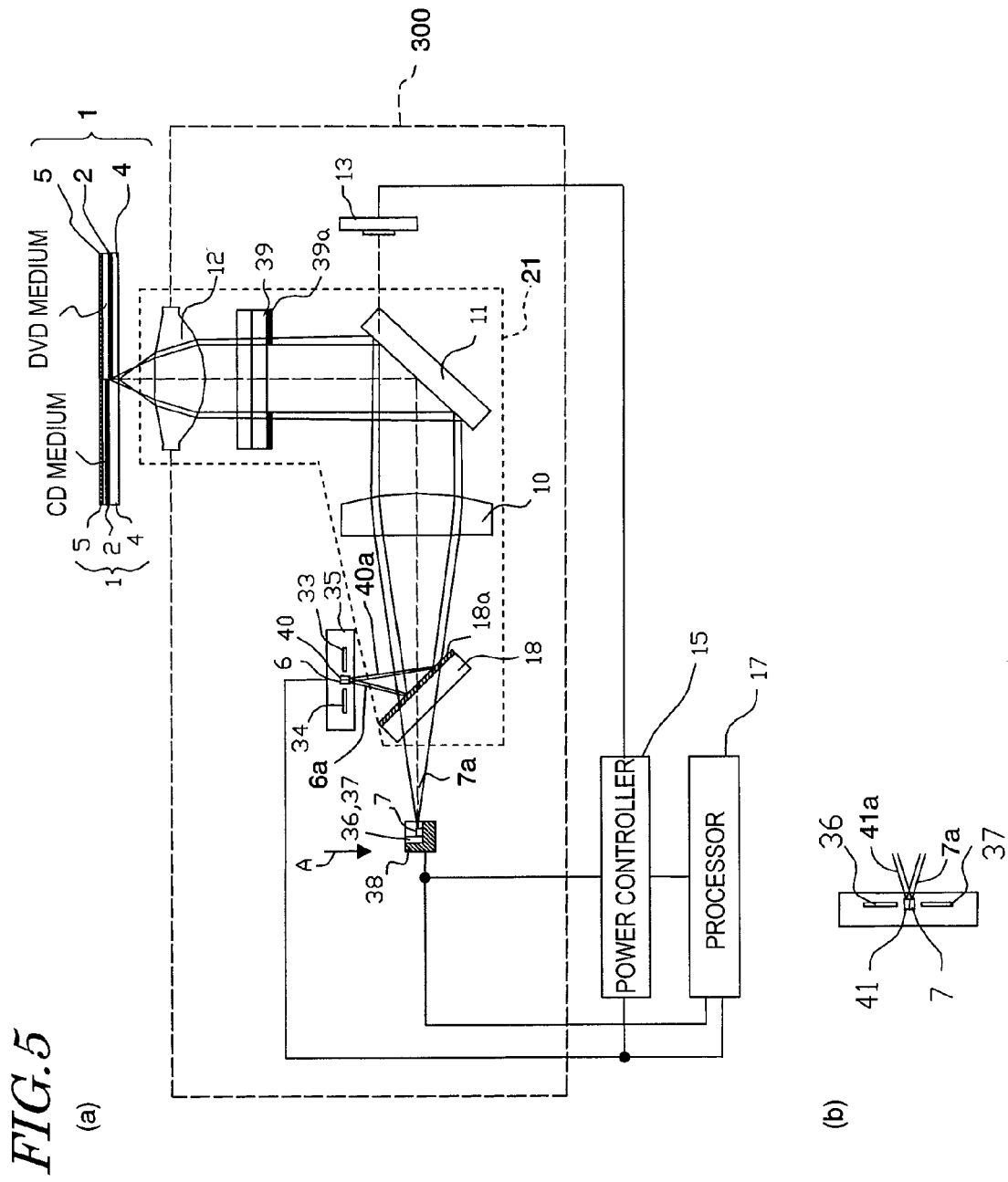
FIG. 5 illustrates an optical pickup device according to a third preferred embodiment of the present invention.

The optical pickup device 300 of the third preferred embodiment shown in FIG. 5 can write user data and visible information on both a DVD-type information medium 1 and a CD-type information medium 1. The CD medium may also be a BD (Blu-ray Disc) medium or an HD-DVD (High Definition DVD) medium, for example. On a BD medium and an HD-DVD medium, data is written with a laser beam that has a center of oscillation at a wavelength of approximately 405 nm.

Figure 7:
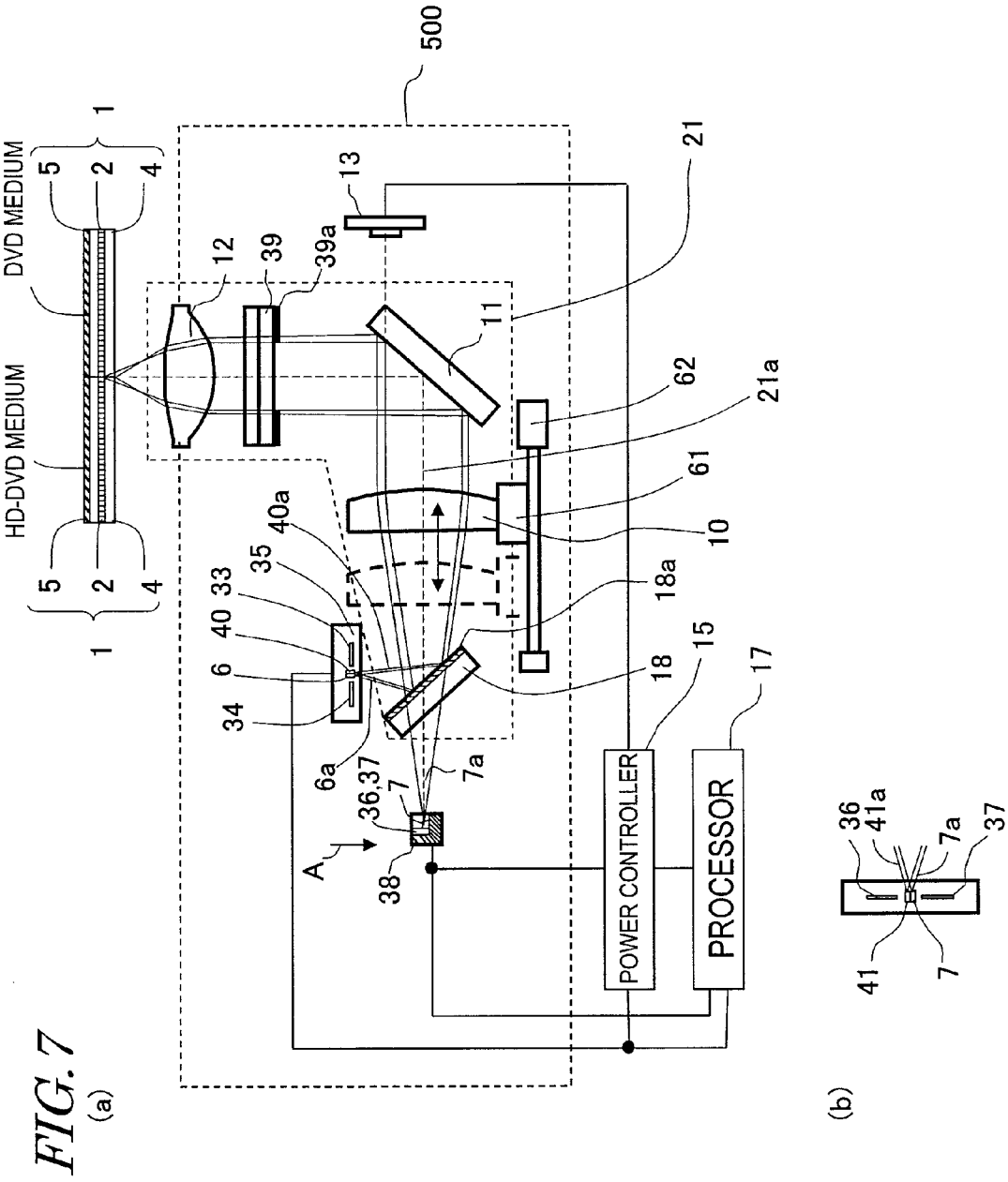
FIG. 7 illustrates an optical pickup device according to a fifth preferred embodiment of the present invention.

A fifth preferred embodiment of an optical pickup device according to the present invention will be described with reference to FIGS. 7(a) and 7(b). FIG. 7(a) illustrates an optical pickup device 500 as the fifth preferred embodiment of the present invention. The optical pickup device 500 can write user data and visible information on both a DVD-type information medium 1 and an HD-DVD-type information medium 1. The left half of the information medium 1 shown in FIG. 7(a) is an HD-DVD medium, while the right half thereof is a DVD medium.

A light source unit 35 of the optical pickup device 500 includes a third light source 40, which is arranged adjacent to the first light source 6 in order to emit a laser beam 40a. FIG. 7(b) illustrates a light source unit 38 as viewed in the direction indicated by the arrow A. The light source unit 38 includes a fourth light source 41, which is arranged adjacent to the second light source 7 in order to emit a laser beam 41a. The oscillation center wavelength of the laser beams 40a and 41a is different from the oscillation center wavelength of the laser beams 6a and 7a. The diffraction element 39 of the optical system 21 includes an aperture film 39a with wavelength selectivity. Alternatively, this aperture film 39a may be provided for the condenser lens 12.

A predetermined gap (of 110 μm, for example) is provided between the points of emission of the first and third light sources 6 and 40. The same predetermined gap (of 110 μm, for example) is also provided between the points of emission of the second and fourth light sources 7 and 41.

In this preferred embodiment, the laser beams 6a and 7a are used to write user data and visible information on a DVD-type information medium 1, while the laser beams 40a and 41a are used to write user data and visible information on an HD-DVD-type information medium 1. Also, in this preferred embodiment, the laser beams 6a and 7a have their center of oscillation at a wavelength of approximately 660 nm, while the laser beams 40a and 41a have their center of oscillation at a wavelength of approximately 405 nm. The diffraction element 39 is provided with an aperture film 39a such that the condenser lens 12 has an NA of approximately 0.63 when the laser beams 6a and 7a are emitted and has an NA of approximately 0.85 when the laser beams 40a and 41a are emitted.

The optical pickup device 500 further includes a CL supporting member 61 to support the collimator lens 10 and a drive section 62 that drives the collimator lens 10 and the CL supporting member 61 along the optical axis 21a of the laser beam. The drive section 62 is a feed mechanism such as a stepping motor and can adjust the position of the collimator lens 10.

In this example, the information layer of the HD-DVD medium has a storage capacity of approximately 15 GB. To perform read/write operations on an HD-DVD medium at high densities, the light beam spot needs to be smaller in size than the light beam spot to perform a read/write operation on a DVD medium. For that reason, to carry out the read/write operation accurately, the spherical aberration should be corrected with even higher precision. For that purpose, the drive section 62 moves the collimator lens 10, along with the CL supporting member 61, in the optical system 21, thereby positioning the collimator lens 10 so as to reduce the spherical aberration to the ideal level. The position where the spherical aberration is reduced to the ideal level may be a position where the signal read from the information layer 2 has the highest level or a position where the jitter has the lowest level. When a read/write operation is performed on a learning area on the information layer 2, the drive section 62 moves the collimator lens 10, thereby determining either a position where the signal read from the information layer 2 has the highest level or a position where the jitter has the lowest level as the position where the spherical aberration is reduced to the ideal level.

Optionally, the position to which the collimator lens 10 should go may be defined in advance and stored in a memory, for example. In performing a read/write operation on a selected layer, the collimator lens 10 is moved to such a position that was defined in advance for that layer.

By adjusting the position of the collimator lens 10, the best light beam spot can be formed on the information layer 2 and recording layer 5 of the DVD medium and the HD-DVD medium. As a result, the write operations can get done with good stability and the quality of the information written can be improved. In addition, by making the best spherical aberration corrections, the light beam spot comes to have increased energy density, and therefore, the visible information can be recorded quickly. Since the light beam spot has an increased energy density, the visible information can be recorded quickly even without increasing the power of the laser beam. Consequently, the life of the light source can be extended, too.

In addition, the same optical pickup device 500 uses the four light sources 6, 7, 40 and 41 that share the same optical system 21 in common. That is why the overall size of an optical disk drive including such an optical pickup device 500 can be reduced.

Embodiment 6

Figure 8:
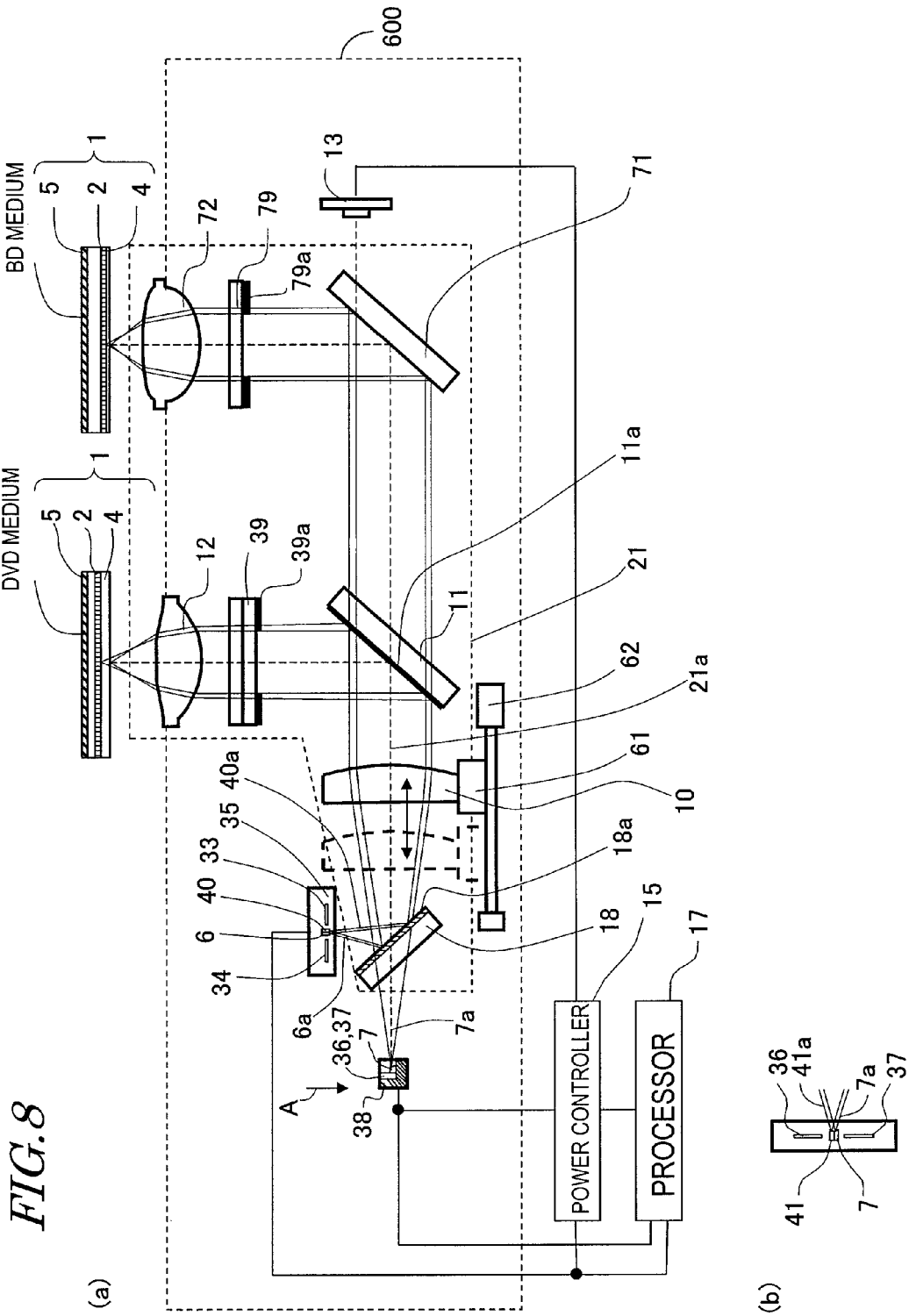
FIG. 8 illustrates an optical pickup device according to a sixth preferred embodiment of the present invention.

Hereinafter, an optical pickup device that can write user data and visible information on both a DVD-type information medium 1 and a BD-type information medium 1 will be described with reference to FIGS. 8(*a*) and 8(*b*). FIG. 8(*a*) illustrates an optical pickup device 600 as a sixth preferred embodiment of the present invention. The optical pickup device 600 can write user data and visible information on both a DVD-type information medium 1 and a BD-type information medium 1. The left half of the information medium 1 shown in FIG. 8(*a*) is a DVD medium, while the right half thereof is a BD medium.

A light source unit 35 of the optical pickup device 600 includes a third light source 40, which is arranged adjacent to the first light source 6 in order to emit a laser beam 40a. FIG. 8(*b*) illustrates a light source unit 38 as viewed in the direction indicated by the arrow A. The light source unit 38 includes a fourth light source 41, which is arranged adjacent to the second light source 7 in order to emit a laser beam 41a. The oscillation center wavelength of the laser beams 40a and 41a is different from the oscillation center wavelength of the laser beams 6a and 7a. The diffraction element 39 of the optical system 21 includes an aperture film 39a with wavelength selectivity. Alternatively, this aperture film 39a may be provided for the condenser lens 12.

A predetermined gap (of 110 μm, for example) is provided between the points of emission of the first and third light sources 6 and 40. The same predetermined gap (of 110 μm, for example) is also provided between the points of emission of the second and fourth light sources 7 and 41.

In this preferred embodiment, the laser beams 6a and 7a are used to write user data and visible information on a DVD-type information medium 1, while the laser beams 40a and 41a are used to write user data and visible information on a BD-type information medium 1. Also, in this preferred embodiment, the laser beams 6a and 7a have their center of oscillation at a wavelength of approximately 660 nm, while the laser beams 40a and 41a have their center of oscillation at a wavelength of approximately 405 nm.

The optical system 21 of this preferred embodiment includes a second mirror 71 to reflect a laser beam that has a center of oscillation at a wavelength of approximately 405 nm, a second condenser lens 72 to condense that laser beam, and a diffraction element 79 arranged on the optical path between the mirror 71 and the second condenser lens 72.

The mirror 11 of this preferred embodiment includes an evaporated film 11a and reflects a laser beam with an oscillation center wavelength of approximately 660 nm but transmits a laser beam with an oscillation center wavelength of approximately 405 nm. The aperture film 39a is provided for the diffraction element 39 such that the condenser lens 12 has an NA of approximately 0.63 when the laser beams 6a and 7a are emitted. The aperture film 79a is provided for the diffraction element 79 such that the second condenser lens 72 has an NA of approximately 0.85 when the laser beams 40a and 41a are emitted.

The optical pickup device 600 further includes a CL supporting member 61 and a drive section 62.

In this example, the information layer of the BD medium has a storage capacity of approximately 25 GB. To perform read/write operations on a BD medium at high densities, the light beam spot needs to be smaller in size than the light beam spot to perform a read/write operation on a DVD medium. For that reason, to carry out the read/write operation accurately, the spherical aberration should be corrected with even higher precision. For that purpose, the drive section 62 moves the collimator lens 10, along with the CL supporting member 61, in the optical system 21, thereby positioning the collimator lens 10 so as to reduce the spherical aberration to the ideal level. The position where the spherical aberration is reduced to the ideal level may be a position where the signal read from the information layer 2 has the highest level or a position where the jitter has the lowest level. When a read/write operation is performed on a learning area on the information layer 2, the drive section 62 moves the collimator lens 10, thereby determining either a position where the signal read from the information layer 2 has the highest level or a position where the jitter has the lowest level as the position where the spherical aberration is reduced to the ideal level.

Optionally, the position to which the collimator lens 10 should go may be defined in advance and stored in a memory, for example. In performing a read/write operation on a selected layer, the collimator lens 10 is moved to such a position that was defined in advance for that layer.

By adjusting the position of the collimator lens 10, the best light beam spot can be formed on the information layer 2 and recording layer 5 of the DVD medium and the BD medium. As a result, the write operations can get done with good stability and the quality of the information written can be improved. In addition, by making the best spherical aberration corrections, the light beam spot comes to have increased energy density, and therefore, the visible information can be recorded quickly. Since the light beam spot has an increased energy density, the visible information can be recorded quickly even without increasing the power of the laser beam. Consequently, the life of the light source can be extended, too.

In addition, the same optical pickup device 600 uses the four light sources 6, 7, 40 and 41 that share the same optical system 21 in common. That is why the overall size of an optical disk drive including such an optical pickup device 600 can be reduced.

Optionally, the light source units 35 and 38 of the optical pickup device 500 or 600 may further include another light source to play CD media and user data and visible information may also be written on a CD medium. The components of the optical pickup devices 100 through 600 described above may be combined with each other in various manners according to the intended use of the given optical pickup device.

While the present invention has been described with respect to preferred embodiments thereof, the present invention is in no way limited to those specific preferred embodiments. But the true spirit and scope of the present invention should be construed only by the appended claims.

INDUSTRIAL APPLICABILITY

An optical pickup device according to the present invention can be used particularly effectively in the field of technology in which visible information, which is directly visible to the user, is recorded on an information medium.

The invention claimed is:
1. An optical pickup device comprising:
a first light source that outputs a first laser beam;
a second light source that outputs a second laser beam; and
an optical system that irradiates an information medium with the first and second laser beams,
wherein the information medium includes:
an information layer having a user data area from/on which user data is read or written; and
a recording layer on which visible information, which is directly visible to a user, is recorded,
wherein the optical pickup device outputs the first laser beam in reading or writing the user data from/on the information layer but outputs the second laser beam in recording the visible information on the recording layer,
the optical system includes a condenser lens that condenses the first and second laser beams toward the information medium,
the first laser beam is incident as a substantially parallel beam on the condenser lens, and
the second laser beam is incident as a converged beam on the condenser lens.

2. The optical pickup device of claim 1, wherein the first light source and the optical system are arranged so as to correct a spherical aberration that produces when the information layer is irradiated with the first laser beam, and
wherein the second light source and the optical system are arranged so as to correct a spherical aberration that produces when the recording layer is irradiated with the second laser beam.

3. The optical pickup device of claim 1, wherein the optical system includes an optical element that reflects one of P and S waves and transmits the other wave, and
wherein one of the first and second laser beams is a P wave and the other laser beam is an S wave, and
wherein the first and second light sources and the optical element are arranged such that one of the first and second laser beams is transmitted through the optical element and the other laser beam is reflected by the optical element.

4. The optical pickup device of claim 1, wherein the optical system includes:
a condenser lens for condensing the first and second laser beams toward the information medium;
a first collimator lens, which is arranged between the first light source and the condenser lens to correct a spherical aberration that produces when the information layer is irradiated with the first laser beam; and
a second collimator lens, which is arranged between the second light source and the condenser lens to correct a spherical aberration that produces when the recording layer is irradiated with the second laser beam.

5. The optical pickup device of claim 1, wherein the optical system includes a collimator lens, and
wherein the optical pickup device further includes:
a supporting member that supports the collimator lens; and
a drive section that drives the collimator lens and the supporting member along an optical axis.

6. The optical pickup device of claim 1, wherein the respective oscillation center wavelengths of the first and second laser beams are the same wavelength.

7. The optical pickup device of claim 1, wherein the power of the second laser beam is higher than that of the first laser beam.

8. The optical pickup device of claim 1, further comprising at least one of a third light source that outputs a third laser beam and a fourth light source that outputs a fourth laser beam,
wherein the oscillation center wavelength of the third and fourth laser beams is different from the oscillation center wavelength of the first and second laser beams.

9. An optical disk drive comprising:
the optical pickup device of claim 1;
a motor for rotating the information medium;
a read/write section, which generates a signal to write user data in writing the user data on the information layer using the optical pickup device but which generates user data based on a read signal supplied from the optical pickup device in reading the user data from the information layer using the optical pickup device;

a write signal generating section for generating a signal to record the visible information on the recording layer using the optical pickup device;

a decision section that makes a decision on whether the light beam spot of one of the first and second laser beam output from the optical pickup device is located on the information layer or the recording layer; and a switching section that determines, based on the decision made by the decision section, whether the light source to energize is the first light source or the second one.

* * * * *